United States Patent [19]

Date et al.

[11] 4,089,011
[45] May 9, 1978

[54] EXPOSURE INFORMATION SETTING DEVICE FOR CAMERA

[75] Inventors: Nobuaki Date, Kawaski; Yoshiaki Watanabe, Fujisawa; Akio Sunouchi; Yukio Mashimo, both of Tokyo; Fumio Ito; Tadashi Ito, both of Yokohama, all of Japan

[73] Assignee: Canon Kabushiki Kaisha, Tokyo, Japan

[21] Appl. No.: 737,345

[22] Filed: Nov. 1, 1976

[30] Foreign Application Priority Data

Nov. 4, 1975 Japan .................................. 50-132304

[51] Int. Cl.² .......................... G03B 7/08; G03B 17/00
[52] U.S. Cl. .............................. 354/23 D; 354/60 A; 354/289
[58] Field of Search .................. 354/23 D, 24, 29, 38, 354/50, 51, 60 R, 60 A, 289

[56] References Cited

U.S. PATENT DOCUMENTS

| 3,928,858 | 12/1975 | Sakurada et al. | 354/23 D |
| 3,971,048 | 7/1976 | Ito et al. | 354/60 L |

FOREIGN PATENT DOCUMENTS

| 2,316,261 | 10/1974 | Germany | 354/23 D |
| 2,517,623 | 10/1975 | Germany | 354/23 D |

*Primary Examiner*—Russell E. Adams
*Attorney, Agent, or Firm*—Toren, McGeady and Stanger

[57] ABSTRACT

The present invention relates to an exposure information setting device for a camera having a digital control system in which the aperture value of the lens is applied to the exposure amount control circuit as digital information by means of the aperture value setting mechanism. The device is so designed that the first comb tooth shaped conductor pattern and the second comb tooth shaped conductor pattern are arranged in parallel with each other in such a manner that a phase difference takes place between them. A pair of series of pulses are obtained by making the contact in functional engagement with the aperture value setting operation, moving slidingly over the first and the second conductor patterns. The direction along which the aperture value information varies is detectable by applying the pair of series of pulses thus obtained to the exposure operational circuit through the phase sorting circuit.

5 Claims, 11 Drawing Figures

WHEN THE CONTACT PIECE IS MOVED ALONG THE UPWARD DIRECTION

WHEN THE CONTACT PIECE IS MOVED ALONG THE DOWNWARD DIRECTION

4,089,011

EXPOSURE INFORMATION SETTING DEVICE FOR CAMERA

BACKGROUND OF THE INVENTION

1. Field of the Invention

The present invention relates to an exposure information setting device for a camera for applying the aperture value of the lens to the exposure operation circuit as digital information by means of the aperture value setting mechanism.

2. Description of the Prior Art

In the case of an automatic exposure control camera (AE camera) provided with the an electrical control circuit, in order to set the aperture value of the lens (in the case of the shutter time priority photography) generally, the value of the element in the electrical circuit is varied by displacing the aperture value setting member in the camera body in functional engagement with the aperture value ring. For example, the resistance value is varied by making the contact piece provided on the set member move slidingly over the resistance body in such a manner that the aperture value is converted into an analog signal with the voltage or the current value thus obtained so as to be applied to the exposure operational circuit of the camera. In the case of such an analog information setting, the high precision cannot be achieved due to the variation of the temperature characteristics and of the resistance characteristics of the resistance body, the wear of the resistance body due to the sliding, the noise formation due to the variation of the pressure of the contact and so on, whereby the cost increase can not be avoided due to the application of special materials.

In order to improve the above mentioned shortcomings of the conventional device, various systems has been proposed for directly obtaining a digital information from the displacement of the aperture value setting member in order not to use the analog information. Even in the case of the setting device of such a digital system, the device becomes unavoidably complicated in order to directly obtain a digital information such as of binary code, grey code and so on from the displacement of the setting member. Thus, for example, in order to digitalize the whole range of the aperture values which are divided into 32 steps, an encoder of 5 bits becomes necessary and, in order to treat this encoder, five contact pieces becomes necessary. That is, a number of contact pieces are arranged electrically independent from each other or five resistance bodies are arranged independent from each other so that it is very difficult to build the arrangement in a limited space such as in a camera body.

On the other hand, there is a method for producing a single "on" signal or a single "off" signal by making the contact pieces move slidingly over a comb tooth shaped conductor pattern instead of directly producing a digital information such as in binary code, grey code and so on from the displacement of the setting member. By means of such an encoder, the composition of the pattern becomes remarkable simple, whereby the on or the off signal as mentioned above can be obtained by making a contact piece move slidingly over the comb tooth shaped conductor pattern in such a manner that the pattern can be constituted compact and fine so that it is very profitable also from the view point of space. However, in the case of the system for setting the aperture value by means of the combination of such comb tooth shaped pattern with a contact piece the scanning directive of the contact piece, is limited to only one. Therefore, in case of the scanning method in accordance with which the contact piece is displaced to and fro optionally, the member of the then produced pulses often does not correspond to the aperture value. Namely, the number of the pulses produced when a contact piece scans the comb tooth shaped conductor pattern is in proportion to the number of the contacts not made between the contact piece and the conductor pattern in such a manner that the number of the input pulses corresponds to the aperture value in the case of the one direction scanning with the contact piece while the number of the input pulses continues to increase in the case of the to and fro scanning with the contact piece out of the proportion to the aperture value. Thus such a system as mentioned above has not been applied to the camera.

A purpose of the present invention is to eliminate the above mentioned shortcoming by enabling the signal obtained from the to and fro scanning of a pair of comb tooth shaped conductor patterns having a phase difference, with a contact piece to be applied to the exposure amount control circuit through the phase sorting circuit.

Further purposes of the invention will be disclosed from the explanations to be made later in accordance with the embodiments in the accompanying drawings.

THE DESCRIPTION OF THE PREFERRED EMBODIMENT

Below the present invention will be explained in detail in accordance with the accompanying drawings.

Figure 1:
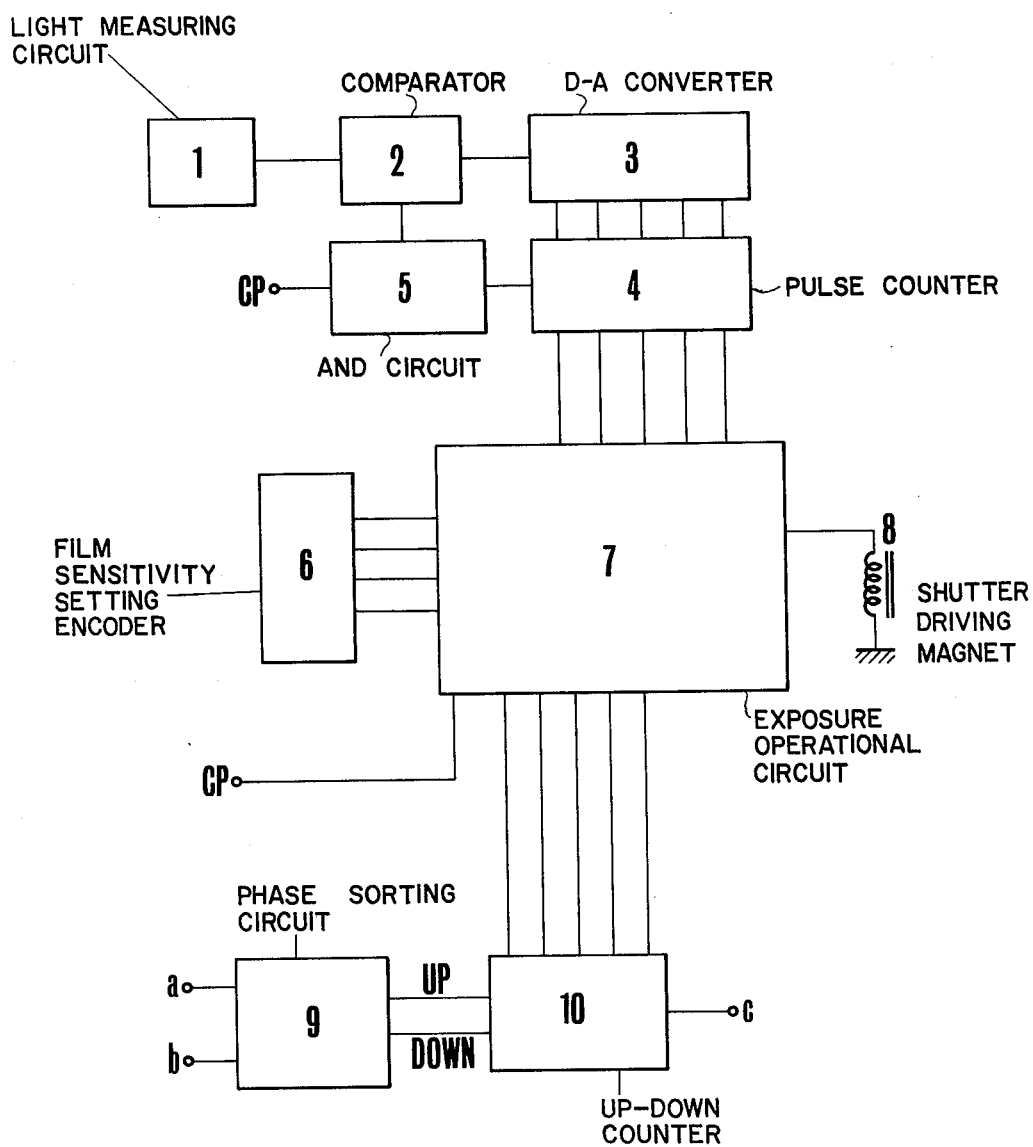
FIG. 1 shows a block diagram of an embodiment in which the aperture value information setting device in accordance with the present invention is applied to the aperture value priority AE camera.
Figure 2:
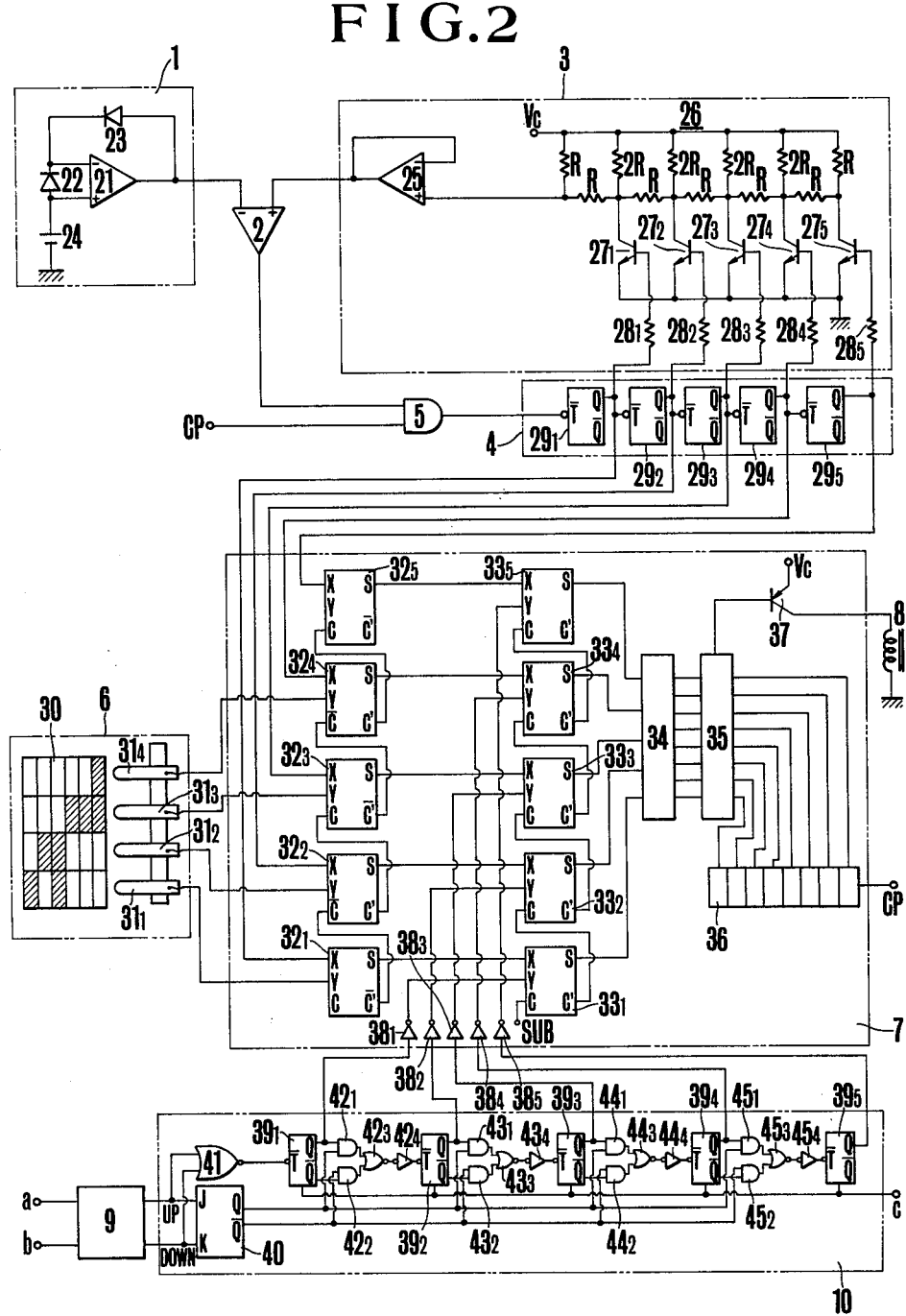
FIG. 2 shows a circuit diagram of the block diagram shown in FIG. 1.

FIG. 1 shows a block diagram of an embodiment in which the aperture value information setting device in accordance with the present invention is applied to the aperture value priority AE camera, while FIG. 2 shows a circuit diagram of the block diagram shown in FIG. 1. In FIGS. 1 and 2, 1 is the light measuring circuit consisting of the operational amplifier 21, the light sensing element 22 such as a silicon photodiode connected between the input terminals of the operational amplifier 21 and the log diode 23 inserted in the feed back circuit of the operational amplifier 21. Further to the positive input terminal of the operational amplifier 21, the standard power source 24 is connected. Further as the output of the light measuring circuit 1, the output of the light sensing element 22 corresponding to the brightness of the object is compressed in a logarithmic way and supplied from the operational amplifier 21. 2 is the comparator where inverting input terminal is connected to the output terminal of the above mentioned operational amplifier 21 and whose non-inversing input terminal is connected to the buffer amplifier 25 to be explained later. 3 is the D-A converter consisting of the ladder resistance supplied with the standard voltage Vc, the transistors $27_1$, $27_2$, $27_3$, $27_4$, and $27_5$ connected to the respective steps of the ladder resistance 26, the base resistances $28_1$, $28_2$, $28_3$, $28_4$ and $28_5$ of the respective transisters $27_1$, $27_2$, $27_3$, $27_4$ and $27_5$ and the buffer amplifier 25 connected to the ladder resistance 26. 4 is the pulse counter consisting of the T type Flip-Flops in five step composition, $29_1$, $29_2$, $29_3$, $29_4$ and $29_5$. The Q output terminals of the respective Flip-Flops $29_1$, $29_2$, $29_3$, $29_4$ and $29_5$ are respectively connected to the above mentioned transisters $27_1$, $27_2$, $27_3$, $27_4$ and $27_5$. 5 is the AND circuit whose first input terminal is connected to the output terminal of the above mentioned comparator 2 and whose second input terminal is supplied with the clock pulse CP. Further the output terminal of the AND circuit 5 is connected to the $\overline{T}$ input terminal of the above mentioned Flip-Flop 29. The comparator 2, the D-A converter 3, the pulse counter 4 and the AND circuit 5 constitute an A-D converter, whereby a digital information corresponding to the analog brightness information is obtained from the output terminals of the Flip-Flops $29_1$, $29_2$, $29_3$, $29_4$ and $29_5$. 6 is the film sensitivity setting encoder which is designed to produce the film sensitivity information while the slide pieces $31_1$, $31_2$, $31_3$ and $31_4$ move slidingly over the code plate 30. 7 is the exposure operation circuit consisting of the first full adders in five step composition $32_1$, $32_2$, $32_3$, $32_4$ and $32_5$, of the second full adders $33_1$, $33_2$, $33_3$, $33_4$ and $33_5$, of the decoder 34, of the comparison circuit 35, of the counter 36 supplied with the clock pulse CP, of the magnet controlling transistor 37 and of the inverters $38_1$, $38_2$, $38_3$, $38_4$ and $38_5$. The X input terminals of the full adders $32_1$, $32_2$, $32_3$, $32_4$ and $32_5$ are respectively connected to the Flip-Flops $29_1$, $29_2$, $29_3$, $29_4$ and $29_5$ and the Y input terminals of the full adders $32_1$, $32_2$, $32_3$ and $32_4$ are respectively connected to the above mentioned slide pieces $31_1$, $31_2$, $31_3$ and $31_4$. The C input terminals of the full adders $32_2$, $32_3$, $32_4$ and $32_5$ are supplied with the carry signal as the shifting signal from the output terminals of the full adders $32_1$, $32_2$, $32_3$, and $32_4$ in the preceding step. Further, the S output terminals of the full adders $32_1$, $32_2$, $32_3$, $32_4$ and $32_5$ are respectively connected to the X input terminals of the full adders $33_1$, $33_2$, $33_3$, $33_4$ and $33_5$. The X input terminals of the full adders $33_1$, $33_2$, $33_3$, $33_4$ and $33_5$ are respectively connected to the Q output terminals of the Flip-Flops $39_1$, $39_2$, $39_3$, $39_4$ and $39_5$ to be explained later through the above mentioned inverters $38_1$, $38_2$, $38_3$, $38_4$ and $38_5$. The C input terminals of the full adders $33_2$, $33_3$, $32_4$ and $32_5$ are supplied with the carry signal as the shifting up signal from the output terminals of the full adders $32_1$, $32_2$, $33_3$ and $33_4$, whereby the C input terminal of the full adder $33_1$ is supplied with the SUB(subtract) signal. Further the outputs of the full adders are supplied to the decoder 34 through the S output terminals, whereby the output of this decoder and that of the counter 36 are compared with each other in the comparison circuit so as to deliver a signal to bring the transister 37 in the switched on state when both of the output coincide with each other. 8 is the shutter driving magnet so designed as to be excited when the above mentioned transister 37 is brought in the switched on state. 9 is the phase sorting circuit so designed as to sort the phases of the pulses from the terminals a and b and to deliver the up signal or the down signal. 10 is the up down; counter consisting of the JK type Flip-Flop 40, the NOR circuit 41 and the T type Flip-Flops in five step composition $39_1$, $39_2$, $39_3$, $39_4$ and $39_5$, whereby among the Flip-Flops $39_1$, $39_2$, $39_3$, $39_4$ and $39_5$ two AND circuits $42_1$, $42_2$, $43_1$, $43_2$, $44_1$, $44_2$, $45_1$ and $45_2$, the NOR circuits $42_3$, $43_3$, $44_3$ and $45_3$ and the inverters $42_4$, $43_4$, $44_4$ and $44_5$ are respectively provided. The up signal as well as the down signal of the phase sorting circuit 90 are applied to the J and K input terminal of the Flip-Flop 40 and the first and the second input terminal of the NOR circuit 41. The output terminal of this NOR circuit 41 is connected to the input terminal of the Flip-Flop $37_5$, while the Q output terminals of the Flip-Flops $39_1$, $39_2$, $39_3$, $39_4$ and $39_5$ are respectively connected to the above mentioned inverters $38_1$, $38_2$, $38_3$, $38_4$ and $38_5$. The first input terminals of the AND circuits $42_1$, $43_1$, $44_1$ and $45_1$ are respectively connected to the Q output terminals of the Flip-Flops $39_1$, $39_2$, $39_3$ and $39_4$, while the second input terminals are connected to the Q output terminal of the Flip-Flop 40. Further the first input terminals of the AND circuits $42_2$, $43_2$, $44_2$ and $45_2$ are respectively connected to the $\overline{Q}$ output terminals of the Flip-Flops $39_1$, $39_2$, $39_3$ and $39_4$, while the second input terminals are connected to the $\overline{Q}$ output terminal of the Flip-Flop 40. The output terminals of the AND circuits $42_1$, $43_1$, $44_1$ and $45_1$ and the output terminals of the AND circuits $42_2$, $43_2$, $44_2$ and $45_2$ are respectively connected to the Flip-Flops $39_2$, $39_3$, $39_4$ and $39_5$ in the next step through the NOR circuits $42_2$, $43_3$, $44_3$ and $45_3$ and the inverters $42_4$, $43_4$, $44_4$ and $45_4$.

Figure 3:
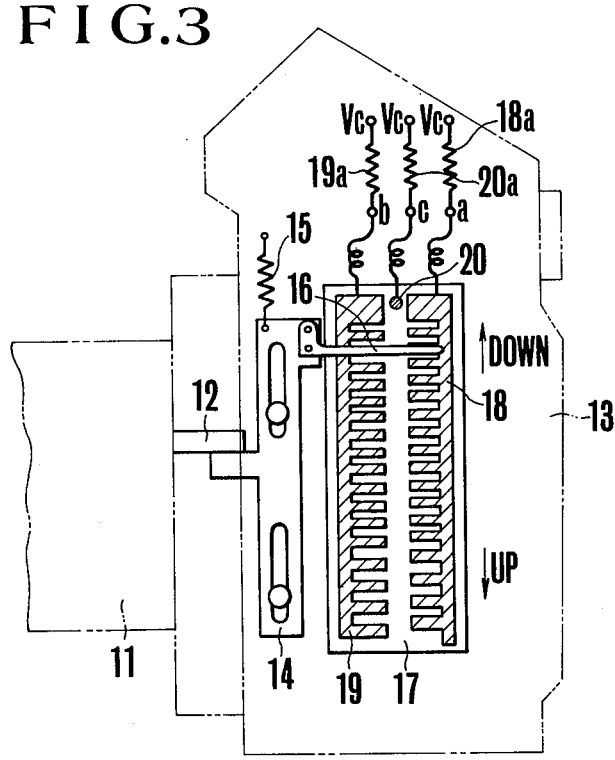
FIG. 3 shows the construction of the aperture information setting mechanism to be used in the device shown in FIGS. 1 and 2.

FIG. 3 shows the aperture value setting mechanism applied to the aperture value priority AE camera or the manually light measuring camera, whereby 11 is the lens barrel, 13 the aperture value signal transmitting lever functionally engaged with the aperture value preset ring not shown in the drawing, of the lens barrel, 13 the camera body and 14 is the diaphragm slide plate provided in the camera body 13 so as to follow the signal transmitting lever 12 by means of the spring 15. 16 is the contact piece secured on the slide plate 14, which is designed to make the slide plate 14 slide with the aperture value signal lever 12 by means of rotating the diaphragm preset ring in the drawing. Further the contact piece 16 is grounded. 17 is the base plate, on which the comb tooth shaped conductor patterns 18 and 19 and the reset conductor pattern 20 for showing the start position are provided. These comb tooth shaped patterns 18 and 19 are arranged in such a manner that the phases of the positions of their comb teeth shift from each other. These conductor patterns 18, 19 and 20 are supplied with the standard voltage Vc by means of lead wires through the terminals a, b and c and the resistances 18a, 19a and 20a, whereby when the contat piece 16 moves slidingly over these conductor patterns 18 and 19 along the upward or the downward direction with the slide motion of the slide plate 14. The pulses produced every time when the contact piece 16 leaves the conductor patterns 18 and 19 are taken out through the terminals a and b. Further, when the contact piece 16 moves slidingly over the conductor pattern c, the reset signal is taken out through the contact c.

Figure 4:
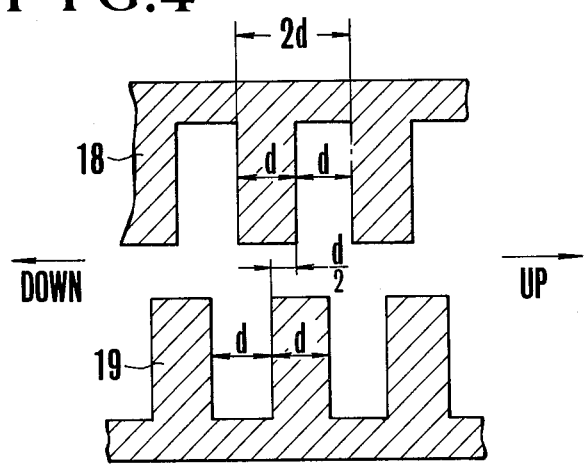
FIG. 4 shows the details of the comb tooth shaped conductor patterns shown in FIG. 3.

FIG. 4 shows the details of the comb tooth shaped conductor patterns 18 and 19 shown in FIG. 3, whereby a conductive part and an insulating part of both of the patterns have a width $d$, while the conductor pattern 18 shifts from the conductor pattern 19 by $\frac{1}{2}d$ in phase. The above mentioned dimension is employed only for the sake of the easy manufacturing, and it is evident that any other dimension than the above will also suffice.

Figure 5:
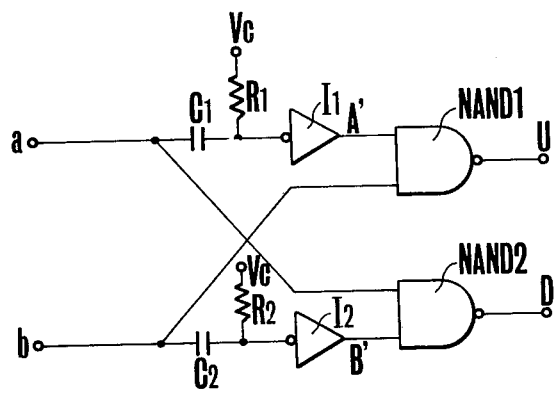
FIG. 5 shows the phase sorting circuit shown in FIGS. 1 and 2.

FIG. 5 shows the phase sorting circuit 9 shown in FIGS. 1 and 2. In the drawing, the terminals a and b are respectively supplied with the up signal and the down signal. $C_1$ and $C_2$ respectively $R_1$ and $R_2$ are the condensers respectively the resistances of the differentiating circuits, whereby the resistances $R_1$ and $R_2$ are supplied with the standard voltage $Vc$ so as to produce pulses corresponding to the trailing edge phases of the input pulses from the terminals a and b. $I_1$ and $I_2$ are the inverters, $NAND_1$ and $NAND_2$ are the NAND gates and the terminals U and D the output terminal for the up signal and the down signal.

Figure 6:
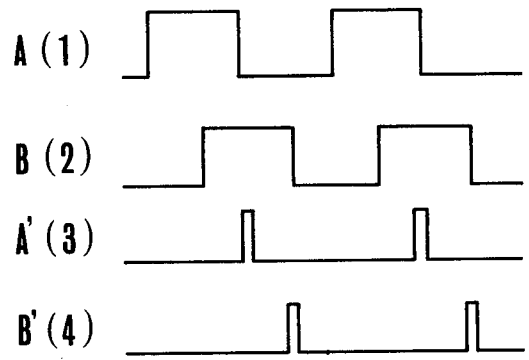
FIG. 6 shows timing charts for explaining the operation of the circuit shown in FIG. 4.
Figure 6:
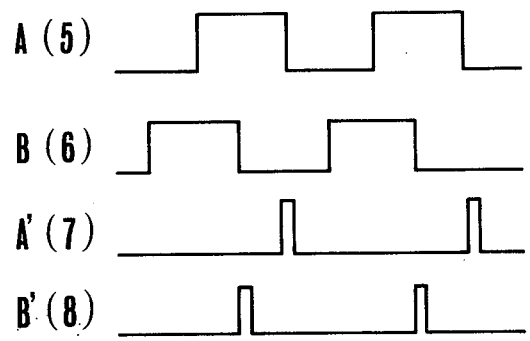

Below, the operation of the above mentioned composition will be explained in accordance with the timing charts shown in FIG. 6.

When the camera is directed toward the object and the power source switch (not shown) is closed, the clock pulses CP is applied to the second input terminal of the AND circuit 5 through the comparator 2 while at the same time the output of the light sensing element 1 corresponding to the object brightness is compressed in a logarithmical way, taken out of the operational amplifier 21 and applied to the first input terminal of the AND circuit as the output of the light measuring circuit 1. Consequently, the clock pulses are given to the counter 4 from the AND gate 5. The Flip-Flops $29_1$, $29_2$, $29_3$, $29_4$ and $29_5$ of the counter 4 are set in accordance with the number of the clock pulses, in accordance with which the transistors $27_1$, $27_2$, $27_3$, $27_4$ and $27_5$ of the D-A converter 3 are brought into the switched-on state. In accordance with the conversion of these transistors $27_1$, $27_2$, $27_3$, $27_4$ and $27_5$ into the switched-on state, each step of the ladder resistance 26 is brought into the conductive state, whereby a corresponding voltage is applied to the non inverting input terminal of the comparator 2 through the buffer amplifier 25. When the voltage applied to the non-inverting input terminal of the comparator 2 coincides with the output voltage of the light measuring circuit 1, the comparator 2 stops the application of the output of the light measuring circuit 1 to the AND circuit 5 in such a manner that the AND circuit 5 stops and the AND operation, and therefore the counter 4, is no more supplied with the clock pulses CP. Consequently, the Flip-Flops $29_1$, $29_2$, $29_3$, $29_4$ and $29_5$ of the counter 4 are brought into the set state in accordance with the number corresponding to the object brightness in such a manner that the object brightness is memorized in the counter 4. The value stored in this counter and the output of the film sensitivity encoder 6 are operated by means of the first full adders $32_1$, $32_2$, $32_3$, $32_4$ and $32_5$. Further, when in the aperture value setting mechanism the contact piece 16 is moved slidingly along the upward direction in FIG. 3 by means of rotation the aperture value preset ring (not shown), the input terminals a and b shown in FIG. 5 are supplied with the rectangular wave signals with a phase difference as is shown in FIG. 6 (1) and (2). These input signals are differentiated so as to produce the pulses (A', B') with phases corresponding to the trailing edge phases as is shown in FIG. 6 (3) and (4). These signals A, B, A' and B' are combined as is shown in FIG. 5 so as to be applied to $NAND_1$ and $NAND_2$. $NAND_1$ delivers the up signal of the output logic "0" from the terminal U when B and A' are altogether logic "1". In this case, no signal is delivered from the terminal D. When on the other hand the contact piece 16 is moved slidingly along the downward direction in the drawing, rectangular wave signals with a phase difference as is shown in FIG. 6 (5) and (6) are applied to the input terminals A and B shown in FIG. 5 and differentiated so as to produce pulses A' and B' with the phases corresponding to the trailing edge phase as is shown in FIG. 6 (7) and (8). Consequently, in this case, the output of $NAND_2$ becomes "0" whereby the down signal is delivered from the output terminal D with the phase of the pulse B'. In this case no down signal is delivered from the output terminal D. The up or the down signal is given to the Flip-Flops $39_1$, $39_2$, $39_3$, $39_4$ and $39_5$ of the up-down counter 10 so as to bring the Flip-Flops $39_1$, $39_2$, $39_3$, $39_4$ and $39_5$ in the output state in accordance with the up or the down signal. The output from the Q output terminals of these Flip-Flops $39_1$, $39_2$, $39_3$, $39_4$, and $39_5$ and the operation output of the above mentioned first full adders $32_1$, $32_2$, $32_3$, $32_4$ and $32_5$ are operated by the second full adders $33_1$, $33_2$, $33_3$, $33_4$ and $33_5$ whose operation output is decoded by means of the decoder 34 so as to be compared with the count value of the counter 36 starting the counting of the clock pulses CP at the same time with the shutter opening by means of the comparison circuit 35 in such a manner that when both values coincide with each other, the transistor 37 is brought into the switched-on state by means of the signal from the comparison circuit 35 so as to excite the magnet 8 and to close the shutter.

Further, when the contact piece 16 is moved slidingly over the start pattern 20 shown in FIG. 3, the reset signal is supplied by the terminal c to the Flip-Flops $39_1$, $39_2$, $39_3$, $39_4$ and $39_5$ of the counter 10 so as to reset the Flip-Flops $39_1$, $39_2$, $39_3$, $39_4$ and $39_5$.

Figure 7:
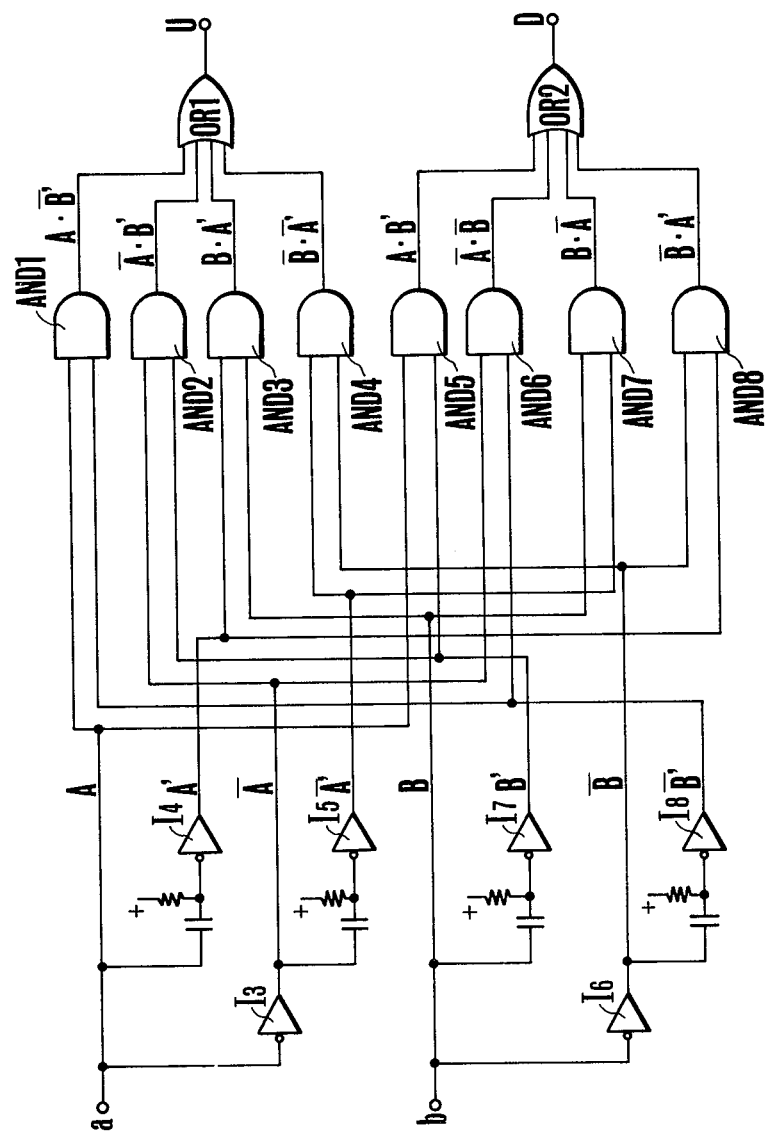
FIG. 7 shows another embodiment of the phase sorting circuit shown in FIG. 5.

FIG. 7 shows another embodiment of the phase sorting circuit of the aperture value information setting device in accordance with the present invention, whereby more pulse signals than in the case of the embodiment shown in FIG. 5 (four times as many) are used. In the drawing $I_3$–$I_8$ are the inverters, $AND_1$–$AND_8$ are the AND gates and $OR_1$ and $OR_2$ the OR gates.

Figure 8:
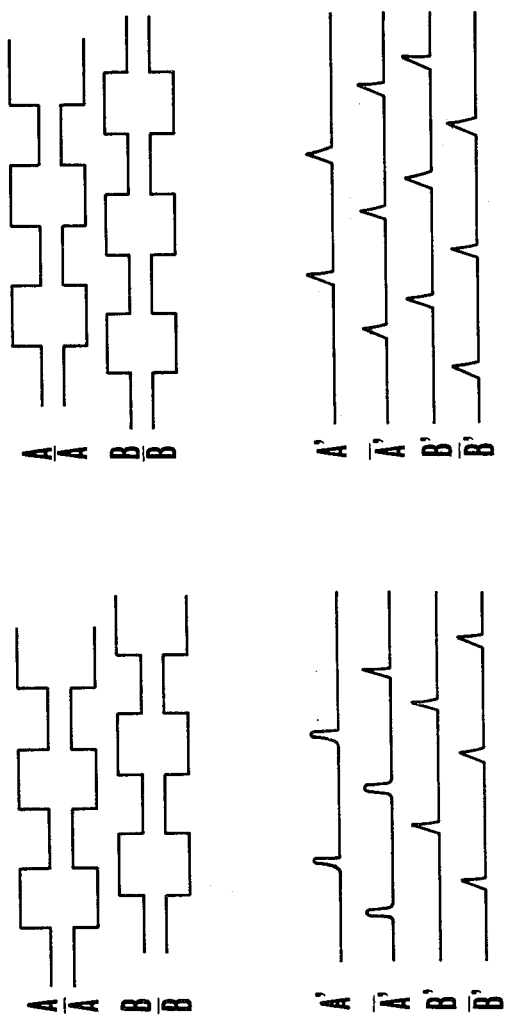
FIG. 8 shows the timing charts for the circuit shown in FIG. 7.

FIG. 8 shows the timing charts for the circuit shown in FIG. 7. When, as is shown in the timing charts, the inverted signals of the input signals A and B are represented by $\overline{A}$, $\overline{B}$, their differentiated signals by A', B' respectively $\overline{A}'$, $\overline{B}'$, the up signal can be obtained from the U-terminal and the down signal from the D-terminal by getting the NAND gate output of the A, $\overline{B}'$. $\overline{A}$, B'. A', $\overline{B}$. $\overline{A}$ through the OR gate, $OR_1$ or $OR_2$ at the time of the "up" and by getting the AND gate output of A, B'. $\overline{A}$, $\overline{B}'$. B, $\overline{A}'$. $\overline{B}$, A' through the OR gate, $OR_1$ or $OR_2$ at the time of the "down". Namely, it is necessary for the phase sorting circuit shown in FIG. 5 to sort the phase of the patterns 18 and 19 precisely whereby smaller number of pulses than that of those produced a single comb tooth shaped pattern with the same number of the comb teeth are obtained (1/2 as many in case of FIG. 6), while four times as large number of pulses as in case of the circuit shown in FIG. 5 can be obtained by means of the phase sorting circuit shown in FIG. 7 in such a manner that the aperture value information can be set more precisely. This is so because in this manner twice as many pulses can be obtained from the pattern with the same distance as that of the single comb tooth shaped pattern.

Figure 9:
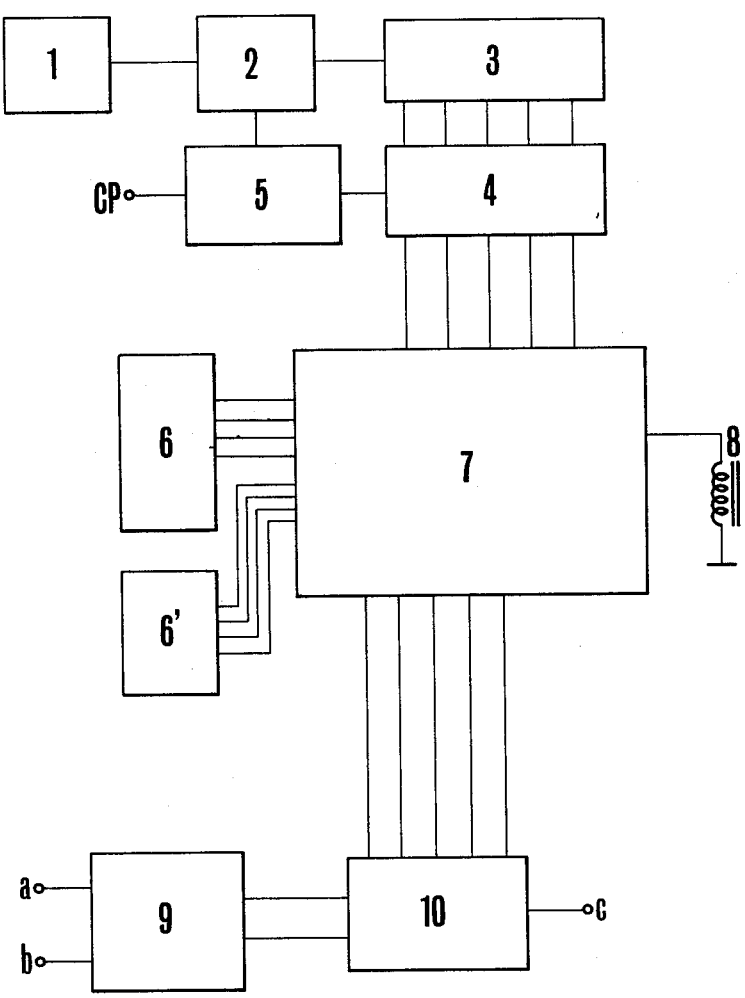
FIG. 9 shows a block diagram of an embodiment in which the aperture value information setting device is applied to the shutter time priority AE camera.
Figure 10:
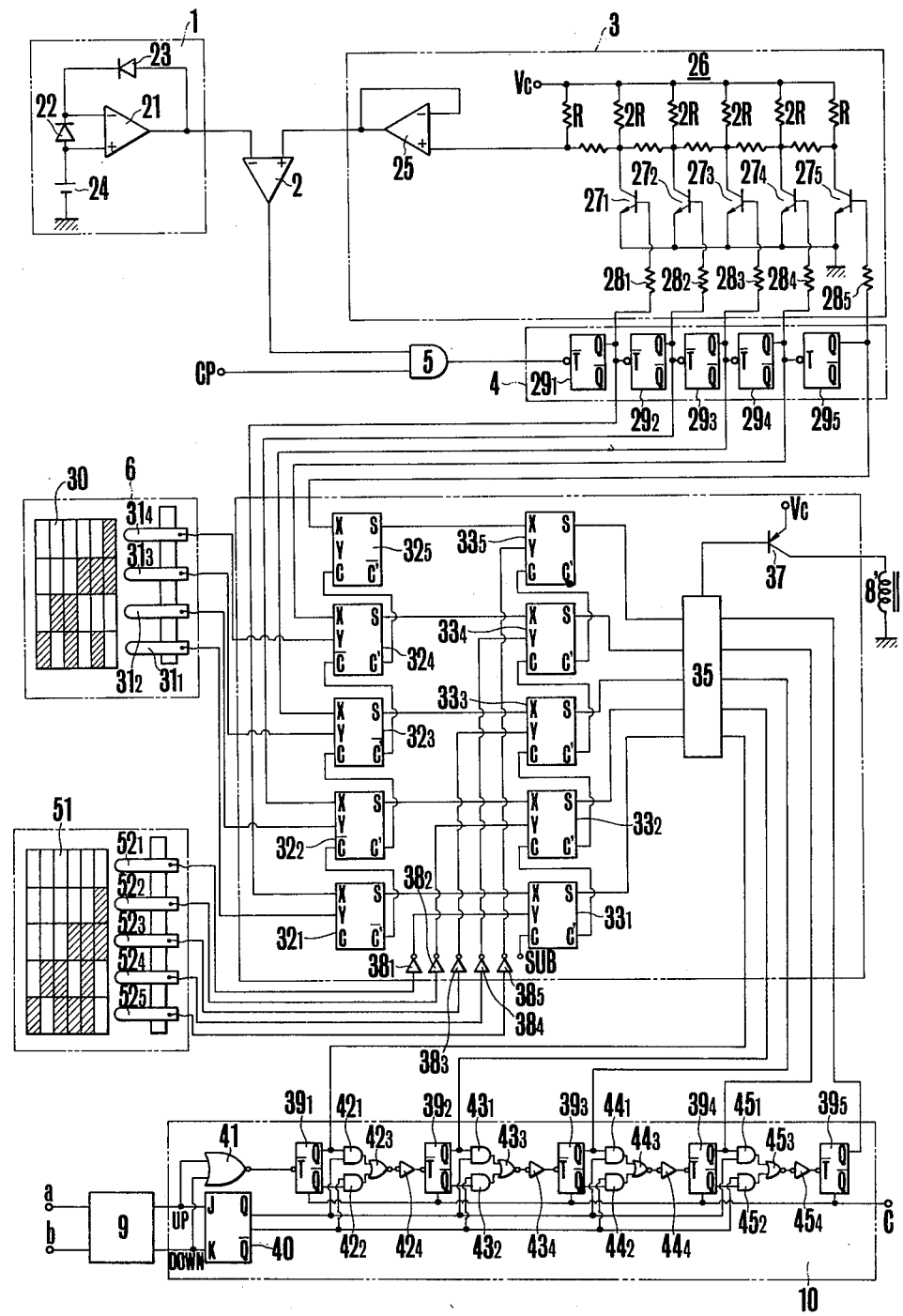
FIG. 10 shows the circuit diagram of the block diagram shown in FIG. 9.

FIG. 9 shows a block diagram of an embodiment in which the aperture value information setting device is applied to the shutter time priority AE camera. This embodiment is constructed nearly in the same way as is shown in FIG. 1, whereby a shutter time encoder 50 is provided in order to digitize the set value to the shutter time to be delivered to the logic control circuit 7. The operation of this circuit is nearly same as that of the circuit shown in FIGS. 1 and 2, so that only the different points will be explained below in accordance with FIG. 10. The shutter time setting encoder 50 consists of a code plate and slide pieces $52_1$, $52_2$, $52_3$, $52_4$ and $52_5$ slidable over the code plate 51 whereby these slide pieces $52_1$, $52_2$, $52_3$, $52_4$ and $52_5$ are connected to the Y input terminals of the second full adders $33_1$, $33_2$, $33_3$, $33_4$ and $33_5$ through the inverters $38_1$, $38_2$, $38_3$, $38_4$ and $38_5$ while the S output terminals of these full adders $33_1$, $33_2$, $33_3$, $33_4$ and $33_5$ are connected to the first input terminal of the comparison circuit 35 and the Q output terminals of the Flip-Flops $39_1$, $39_2$, $39_3$, $39_4$ and $39_5$ are connected to the second input terminal of the comparison circuit 35. Hereby 8' is the aperture value adjusting magnet.

As a consequence, the exposure operation circuit 11 serves to operate the object brightness information, the film sensitivity information and the shutter time information so as to supply the operation result to the first input terminal of the comparison circuit 35 in the same way as in case of the above mentioned embodiment while the aperture value information is supplied to the second input terminal of the comparison circuit 35 in functional engagement with the shutter release operation of the camera. This aperture value information is obtained as follows.

Figure 11:
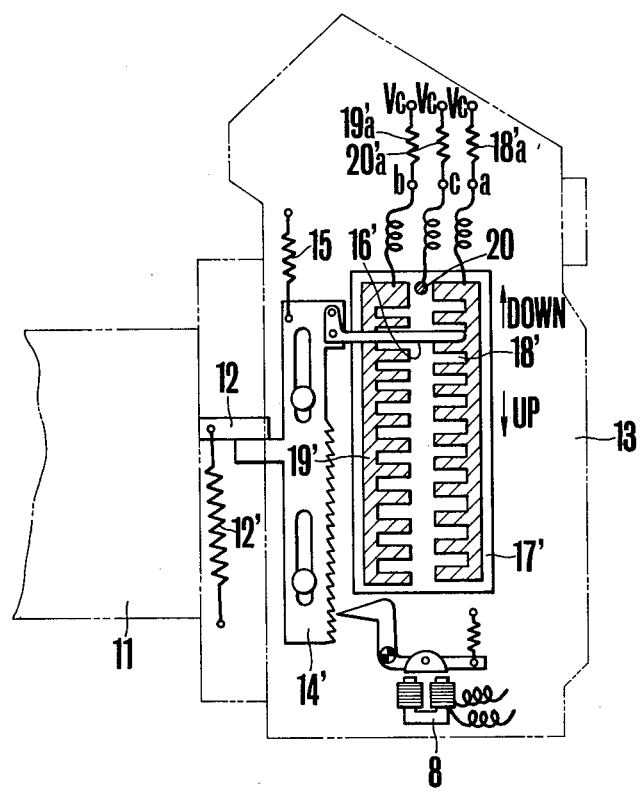
FIG. 11 shows the composition of the aperture value information setting mechanism to be used in the device shown in FIGS. 9 and 10.

FIG. 11 shows the composition of an embodiment of the aperture value information setting device in accordance with the present invention of the shutter time priority AE camera. In the drawing, the signal A or B obtained from the terminals a or b by driving the aperture slide plate 14' downwards by means of the spring 12' and the lever 12 in the lens so as to make the contact piece 16' move slidingly over the base plate 17' is sorted out by means of the phase sorting circuit 9. The up signal or the down signal is obtained in accordance with the slide position of the contact piece 18'. This signal is counted upwards or downwards by means of the aperture value counter 10 in such a manner that when the value stored in the counter 10 reaches a certain predetermined proper aperture value, the magnet 8' is excited by means of the output of the comparison circuit 35 of the exposure operation circuit 7 so as to stop the slide motion of the slide plate 14'. In the case of the device shown in the drawing, the slide plate 14' is slided upwards or downwards by means of the spring 12'.

As explained above, in the case of the aperture value information setting device in accordance with the present invention, the signal obtained when one contact piece is moved slidingly over a pair of comb tooth shaped patterns with a phase difference along the upward and the downward direction, is sorted out by means of the phase sorting circuit so as to be able to carry out an exact up, down counting. Hereby the miscounting is prevented at the time of the digital input of the aperture value information while, further, a number of pulse signals can be obtained from the comb tooth shaped patterns arranged in a small space, so that the device can be applied to the digital control camera with great efficiency. In the case of the above mentioned embodiment, a phase difference is provided between the comb tooth shaped pattern, whereby it is evident that the same effect can be obtained when a phase difference is provided between the contact pieces instead of between the position of the comb teeth.

What is claimed is:

1. An exposure information setting device for a camera comprising:
   a photographic information setting means;
   a first comb tooth shaped conductor pattern;
   a second comb tooth shaped conductor pattern, said pattern being arranged in parallel with the first conductor pattern in such a manner that a phase difference takes place between the first and said conductor pattern;
   a scanning means for scanning the first and the second conductor pattern, said means being operable in functional engagement with the photographic information setting means;
   a first pulse generating means for generating pulses in accordance with the scanning of the first conductor pattern by means of the scanning means;
   a second pulse generating means for generating pulses in accordance with the scanning of the second conductor pattern by means of the scanning means;
   a means for sorting out the phases of the outputs from the first and the second pulse generating pulses, said means including a first signal generating means and a second signal generating means, whereby either the first or the second signal generating means in operated in accordance with the phase sorting;
   an up - down counter for carrying out the counting in accordance with the output of the first or the second signal generating means; and
   an exposure operation means for obtaining the exposure value in accordance with the value counted by the up-down counter.

2. An exposure information setting device for a camera in accordance with claim 1 wherein the photographic information setting means is the aperture value setting mechanism which is manually set.

3. An exposure information setting device for a camera in accordance with claim 1 wherein the photographic information setting means is the aperture value setting mechanism which is automatically adjusted in functional engagement with the shutter release operation of the camera.

4. An exposure information setting device for a camera in accordance with claim 1 wherein the first and the second signal generating means respectively include a means for generating a differentiated pulses in accordance with the output of the first or the second pulse generating means and a coincidence signal generating means for generating a signal when the output pulses of the differentiating pulse generating means and those of the second or the first pulse generating means coincide with the each other.

5. An exposure control device for a camera comprising:

a light measuring means, said means producing an electrical signal in accordance with the object brightness;

a first pulse generating means for producing pulses whose number corresponds to the electrical signal from the light measuring means;

a counter for counting the number of the pulses from the pulse generating means;

a shutter time setting means, said means producing a digital signal converted in code in accordance with the set shutter time;

a diaphram adjusting means, said means being operable in functional engagement with the shutter release of the camera;

a first comb tooth shaped conductor pattern;

a second comb tooth shaped conductor pattern, said second conductor pattern being arranged in parallel with the first conductor pattern in such a manner that a phase difference takes place between said second and the first conductor pattern;

a scanning means for scanning the first and the second conductor pattern, said means being operable in functional engagement with the diaphragm adjusting means;

a second pulse generating means for producing pulses in accordance with the scanning of the first conductor pattern by means of the scanning means;

a third pulse generating means for producing pulses in accordance with the scanning of the second conductor pattern by means of the scanning means;

a means for sorting the phase of the output pulses from the second and the third pulse generating means, said means including the first and the second signal generating means, whereby either the first or the second signal generating means is operated in accordance with the phase sorting;

an up - down counter for carrying out the counting in accordance with the respective outputs of the first and second signal generating means;

an exposure operation means for operating the output of the shutter time setting means and the value counted by means of the counter;

a comparison means for comparing the value operated by means of the exposure operation means with the value counted by means of the up-down counter, said means producing an electrical signal when both of the value reach a certain determined value and a lock means for locking the operation of the diaphragm adjusting means, said means being operable by means of the electrical signal from the comparison means.

* * * * *